(12) United States Patent
Liao

(10) Patent No.: US 9,616,509 B2
(45) Date of Patent: Apr. 11, 2017

(54) APPARATUS FOR FIXING KNIFE PLATE WITH SAW BLADE OF SAW MACHINE

(76) Inventor: Hui-Lan Liao, Dali (TW)

( * ) Notice: Subject to any disclaimer, the term of this patent is extended or adjusted under 35 U.S.C. 154(b) by 1368 days.

(21) Appl. No.: 12/785,645

(22) Filed: May 24, 2010

(65) Prior Publication Data

US 2011/0056359 A1    Mar. 10, 2011

(30) Foreign Application Priority Data

Sep. 10, 2009    (CN) .......................... 2009 2 0169518

(51) Int. Cl.
| | |
|---|---|
| B27G 19/08 | (2006.01) |
| B23D 45/06 | (2006.01) |
| B27B 5/29 | (2006.01) |
| B27G 19/02 | (2006.01) |

(52) U.S. Cl.
CPC ........... *B23D 45/065* (2013.01); *B27G 19/02* (2013.01); *B27G 19/08* (2013.01); *Y10T 83/2077* (2015.04); *Y10T 83/9464* (2015.04)

(58) Field of Classification Search
CPC .. B23D 45/065; B23D 45/066; B23D 45/067; B23D 45/06; B23D 47/025; B23D 47/04; B27G 19/08; B27G 19/02; B27G 19/10; B27B 3/20; B27B 5/29; Y10T 83/2077; Y10T 83/773; Y10T 83/9464; Y10T 83/9469; Y10T 83/9471
USPC ...... 83/102.1, 477.2, 698.41, 698.51, 698.61
See application file for complete search history.

(56) References Cited

U.S. PATENT DOCUMENTS

| | | | | | |
|---|---|---|---|---|---|
| 2,719,547 | A | * | 10/1955 | Gjerde .......................... | 83/471.3 |
| 4,599,927 | A | * | 7/1986 | Eccardt et al. ................. | 83/473 |
| 4,962,685 | A | * | 10/1990 | Hagstrom ....................... | 83/397 |
| 7,546,791 | B2 | * | 6/2009 | Liu et al. ...................... | 83/477.1 |
| 8,127,648 | B2 | * | 3/2012 | Arvey ........................... | 83/102.1 |
| 2006/0032355 | A1 | * | 2/2006 | Wang ........................... | 83/471.1 |
| 2007/0074612 | A1 | * | 4/2007 | Yu ................................ | 83/477.2 |
| 2007/0074613 | A1 | * | 4/2007 | Yu .................................. | 83/581 |
| 2007/0227327 | A1 | * | 10/2007 | Liu et al. ...................... | 83/477.2 |
| 2008/0223189 | A1 | * | 9/2008 | Tanaka ........................ | 83/477.2 |
| 2009/0158906 | A1 | * | 6/2009 | Shibata ........................ | 83/477.2 |
| 2009/0266213 | A1 | * | 10/2009 | Liu et al. ...................... | 83/471.2 |
| 2010/0024620 | A1 | * | 2/2010 | Arvey ............................ | 83/397 |

FOREIGN PATENT DOCUMENTS

CN              200942442 Y        9/2007

* cited by examiner

*Primary Examiner* — Clark F Dexter
(74) *Attorney, Agent, or Firm* — Alan D. Kamrath; Kamrath IP Lawfirm, P.A.

(57) ABSTRACT

An apparatus for fixing a saw blade and a knife plate of a saw grinding machine includes a driving device including an axis; and a fixture plate having a first end and a second end. The fixture plate includes a connective hole coupled to the driving device, and a coupled portion defined at the first end thereof. The saw blade is pivotally connected to the axis of the driving device, with the saw blade and the fixture plate moved with respect to the driving device simultaneously. The knife plate is coupled to the coupled portion of the fixture plate and includes a blocked side formed on a side thereof, with a vertical distance between the blocked side and the saw blade maintained to be fixed.

8 Claims, 10 Drawing Sheets

APPARATUS FOR FIXING KNIFE PLATE WITH SAW BLADE OF SAW MACHINE

SUMMARY OF THE INVENTION

Accordingly, the object is achieved by providing an apparatus for fixing a saw blade and a knife plate of a saw grinding machine, with the apparatus comprising a driving device and a fixture plate.

The knife plate and the saw blade can be moved with the fixture plate simultaneously to maintain a vertical distance between the knife plate and the saw to be fixed. Therefore, the knife plate can split wood accurately. The knife plate includes a coupled portion having a thickness to firmly couple with two projections formed on a coupled portion of the fixture plate.

Other advantages and features of the present invention will become apparent from the following descriptions referring to the drawings.

BRIEF DESCRIPTION OF THE DRAWINGS

The present invention will be described through detailed illustration of three embodiments referring to the drawings.

DETAILED DESCRIPTION OF THE PREFERRED EMBODIMENTS

Figure 1:
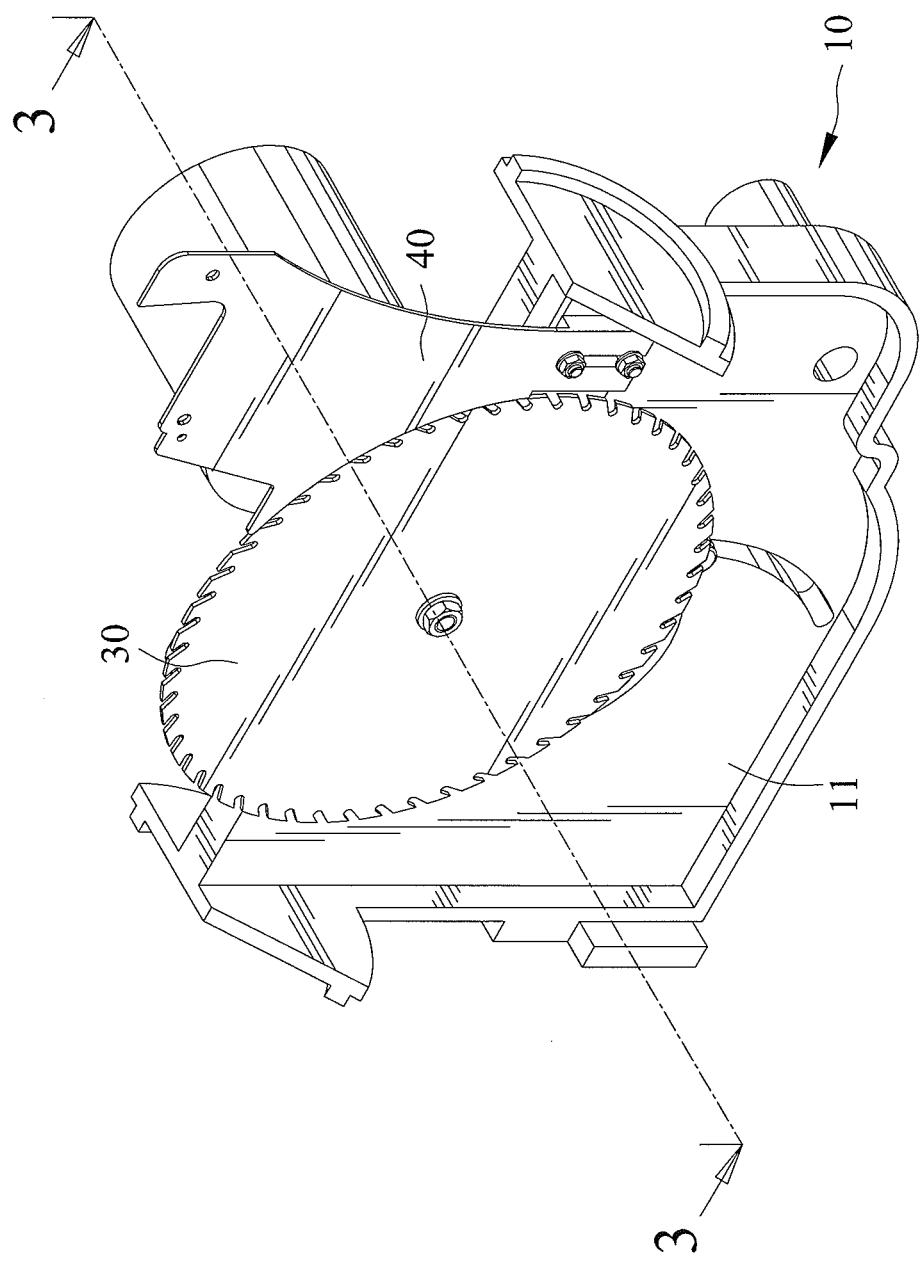
FIG. 1 is a perspective view of an apparatus for fixing a saw blade and a knife plate of a saw grinding machine according to the preferred embodiment of the present invention.
Figure 2:
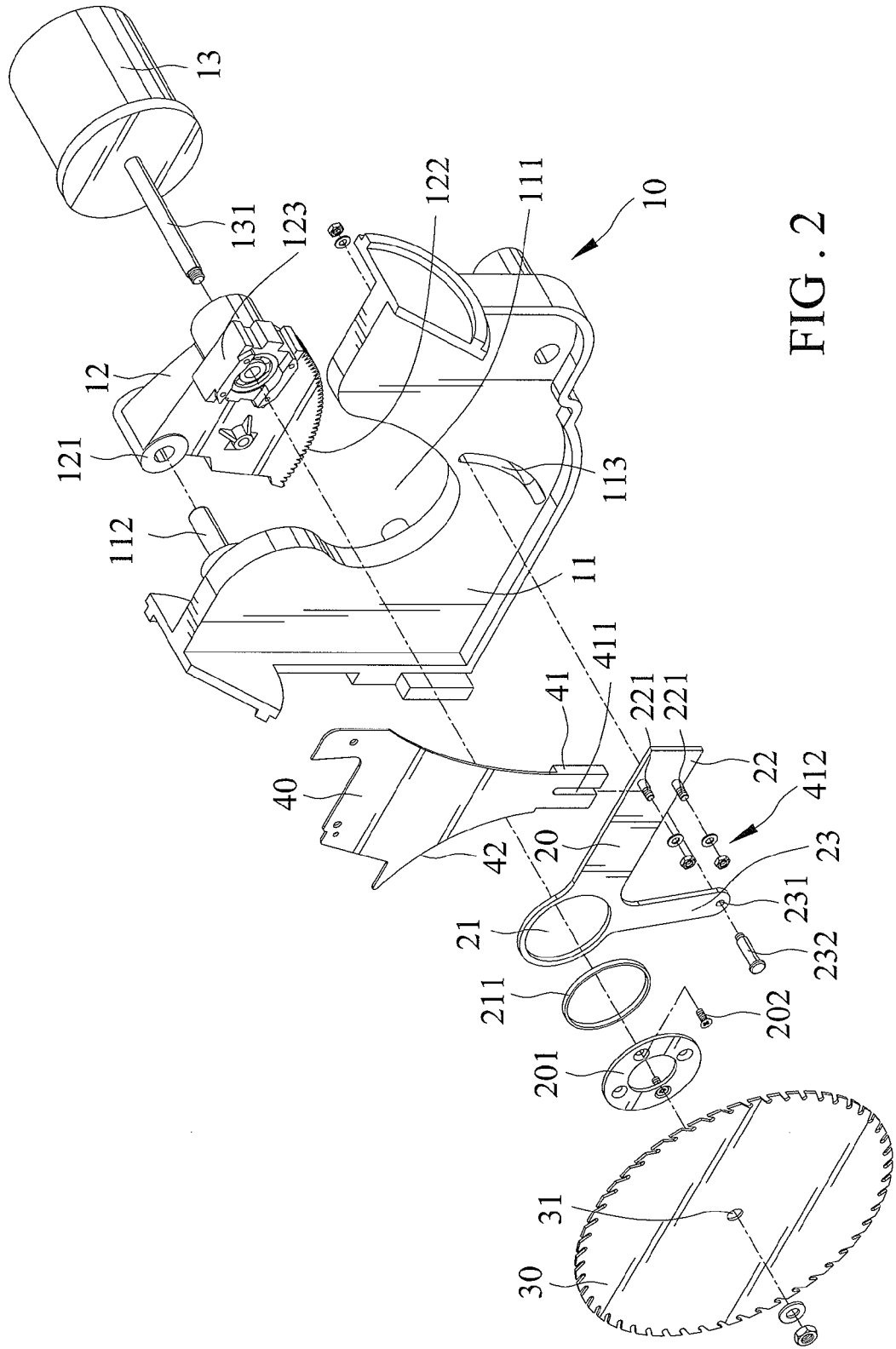
FIG. 2 is an exploded view of the apparatus shown in FIG. 1.
Figure 3:
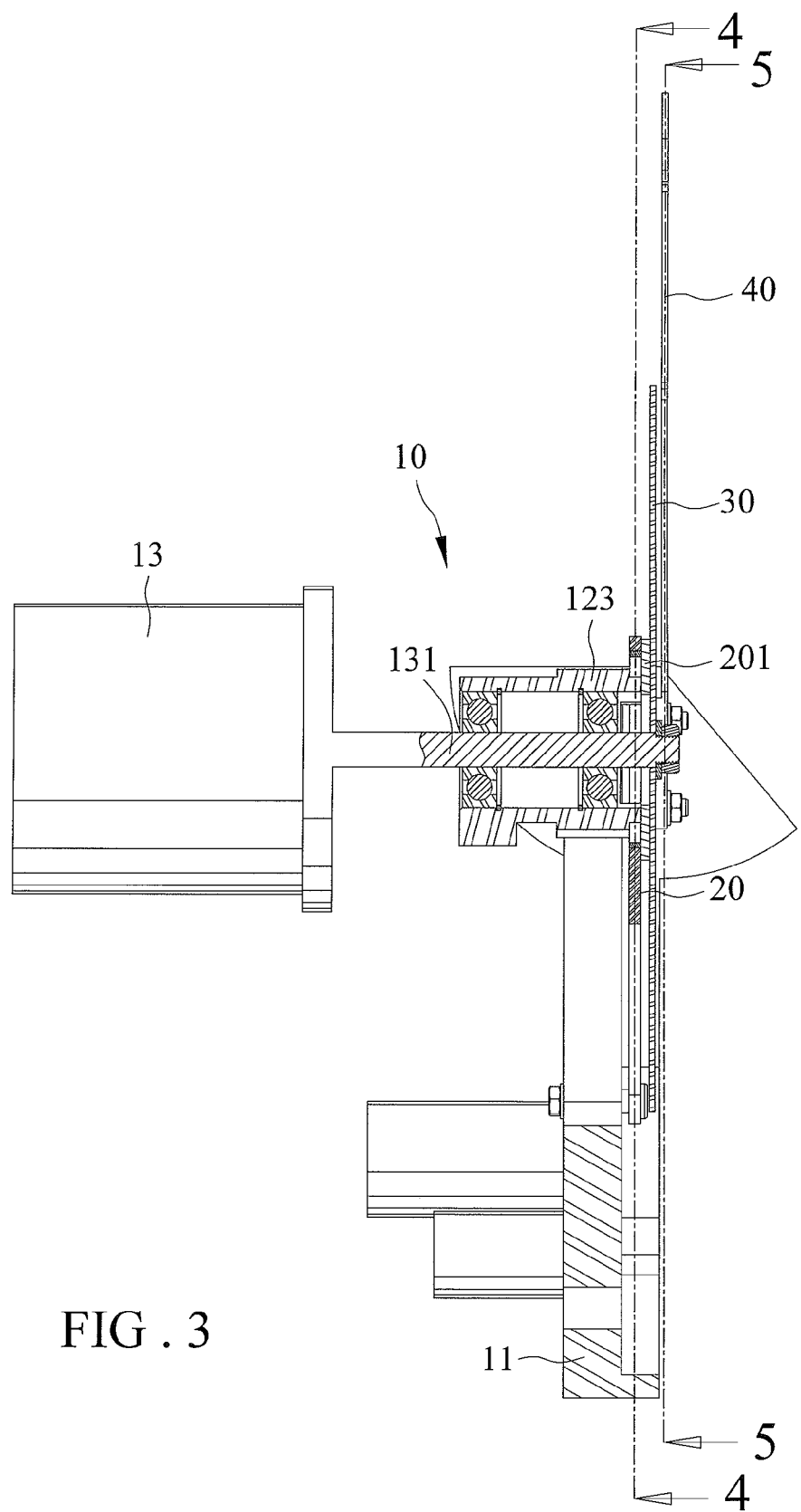
FIG. 3 is a cross-sectional view taken along 3-3 in FIG. 1.
Figure 4:
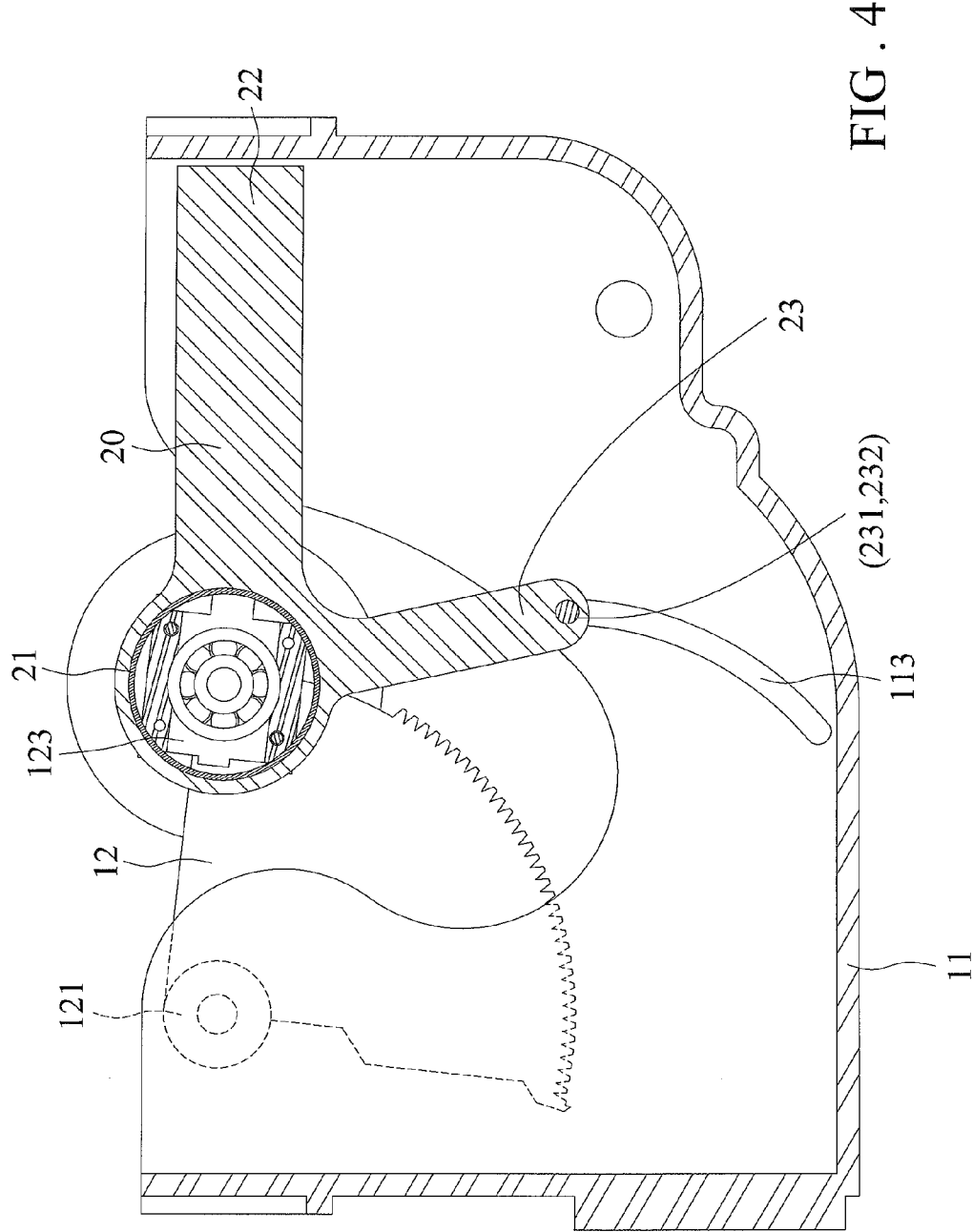
FIG. 4 is a cross-sectional view taken along 4-4 in FIG. 3.
Figure 5:
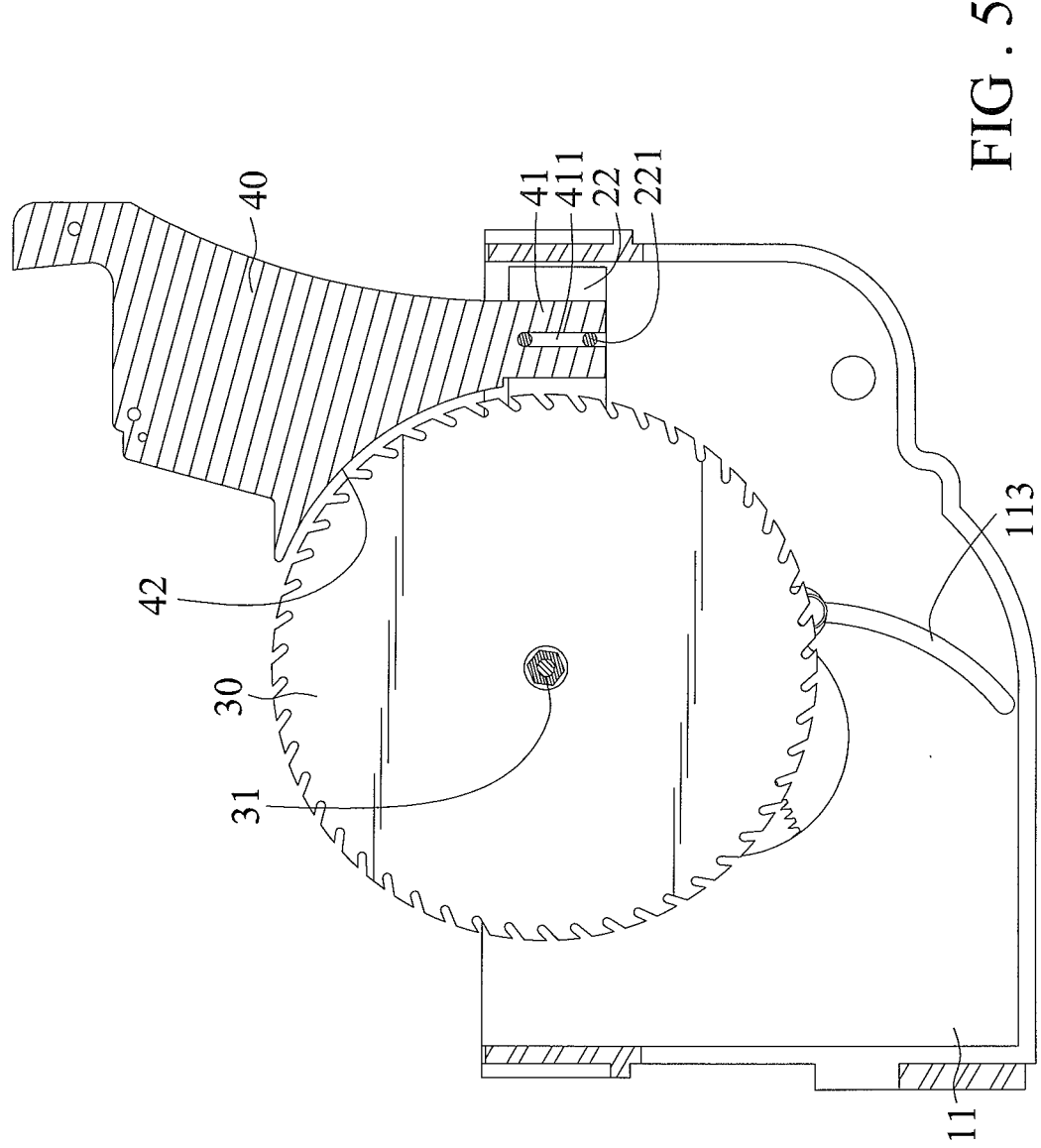
FIG. 5 is a cross-sectional view taken along 5-5 in FIG. 3.
Figure 6:
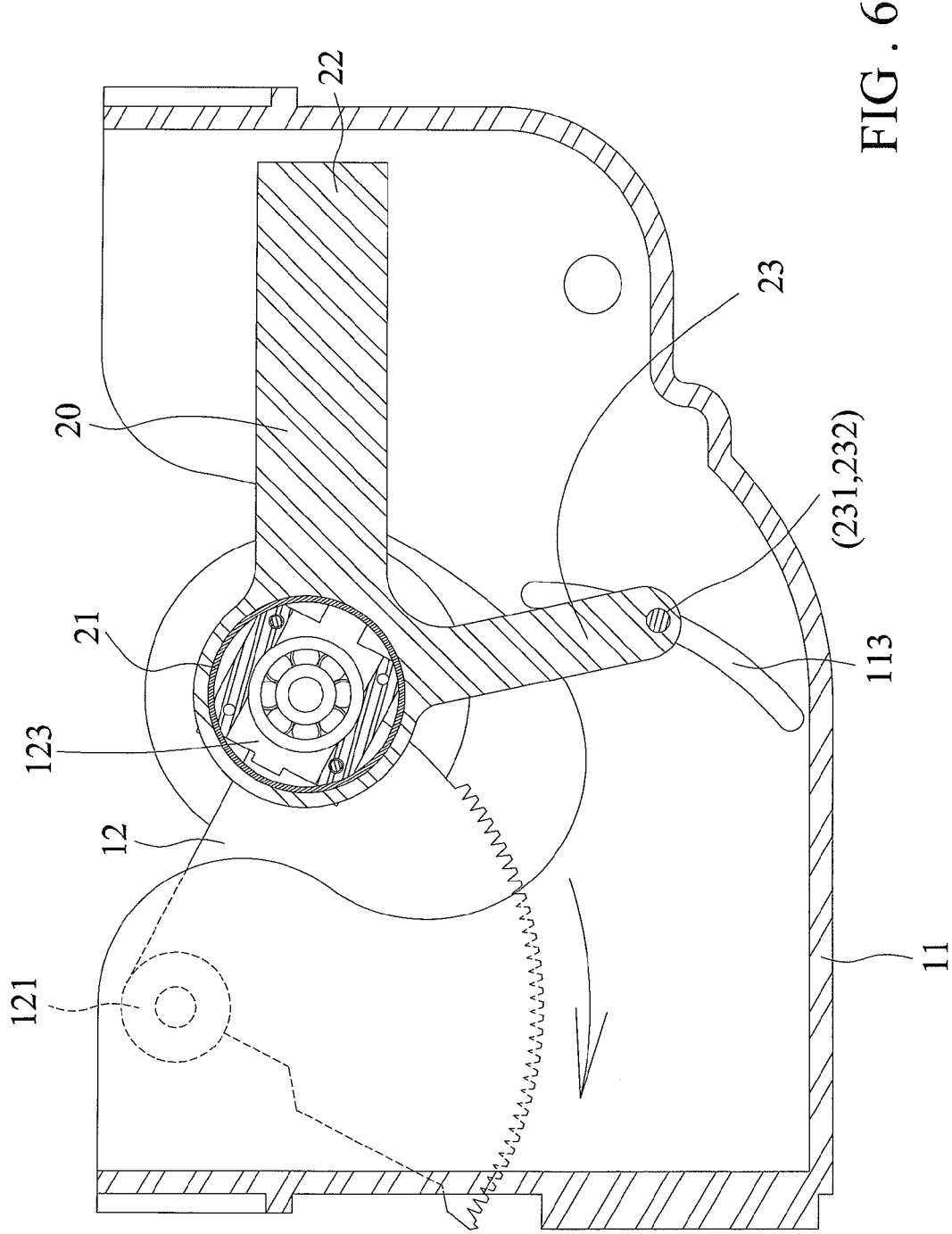
FIG. 6 is a cross-sectional view similar to FIG. 4, illustrating the guiding portion moved along the adjustment trough.
Figure 7:
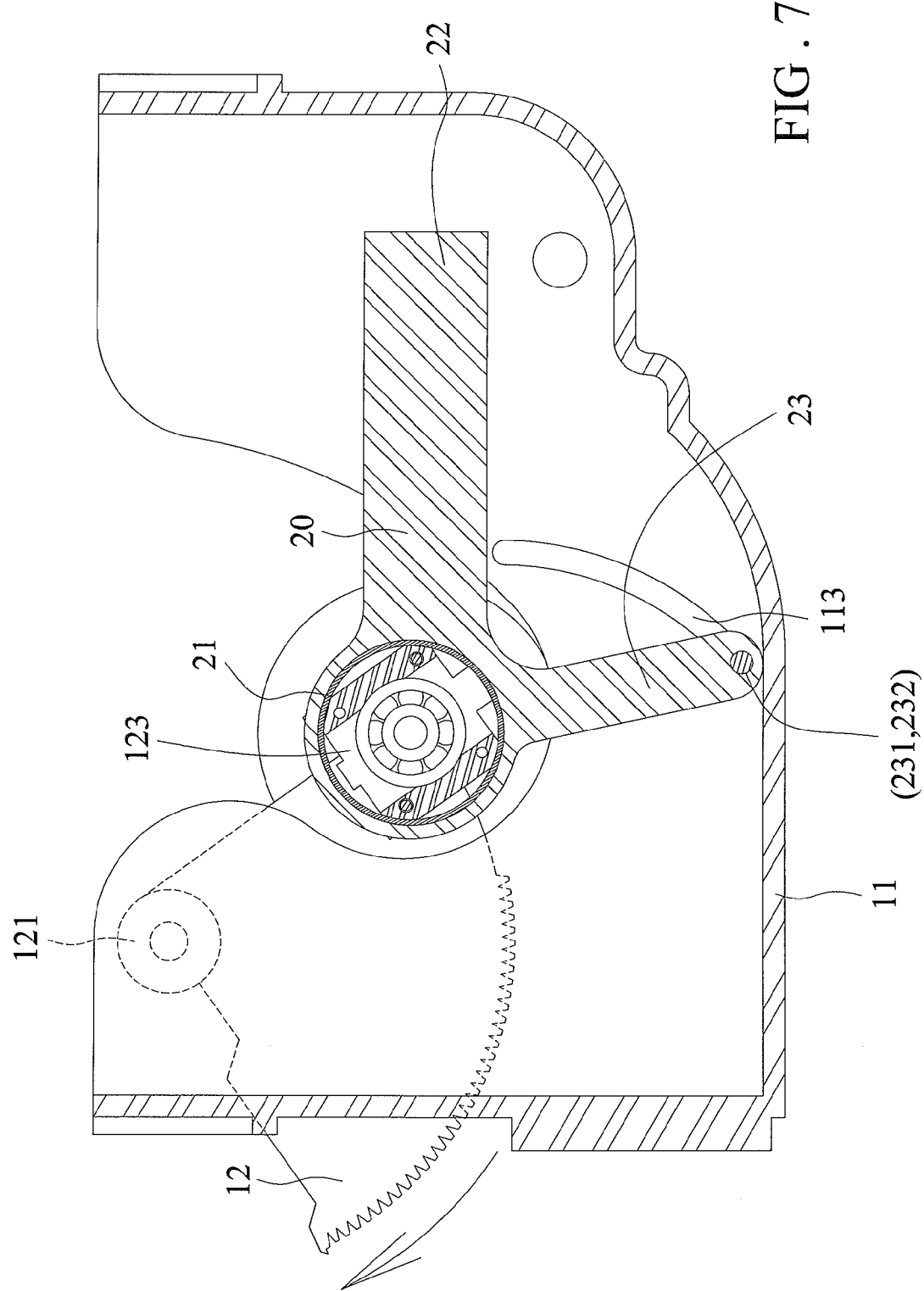
FIG. 7 is a cross-sectional view similar to FIG. 6, illustrating the guiding portion moved to the bottom of the adjustment trough.
Figure 8:
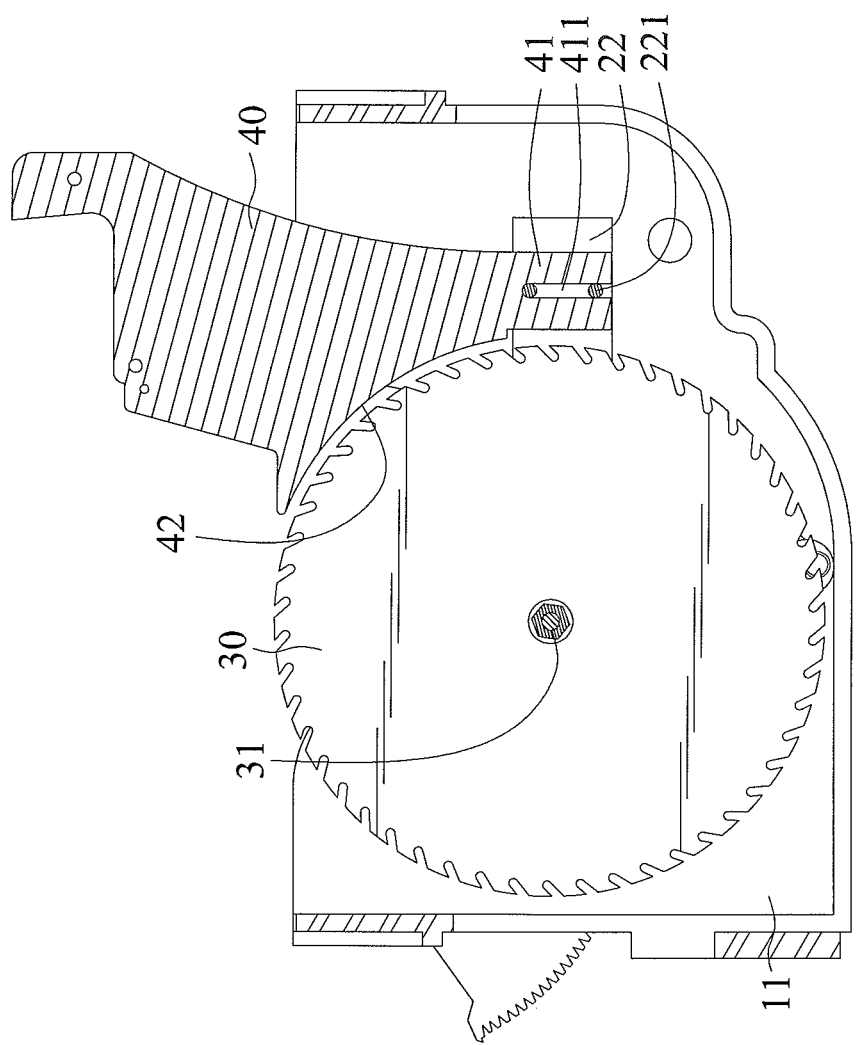
FIG. 8 is another cross-sectional view similar to FIG. 7.
Figure 9:
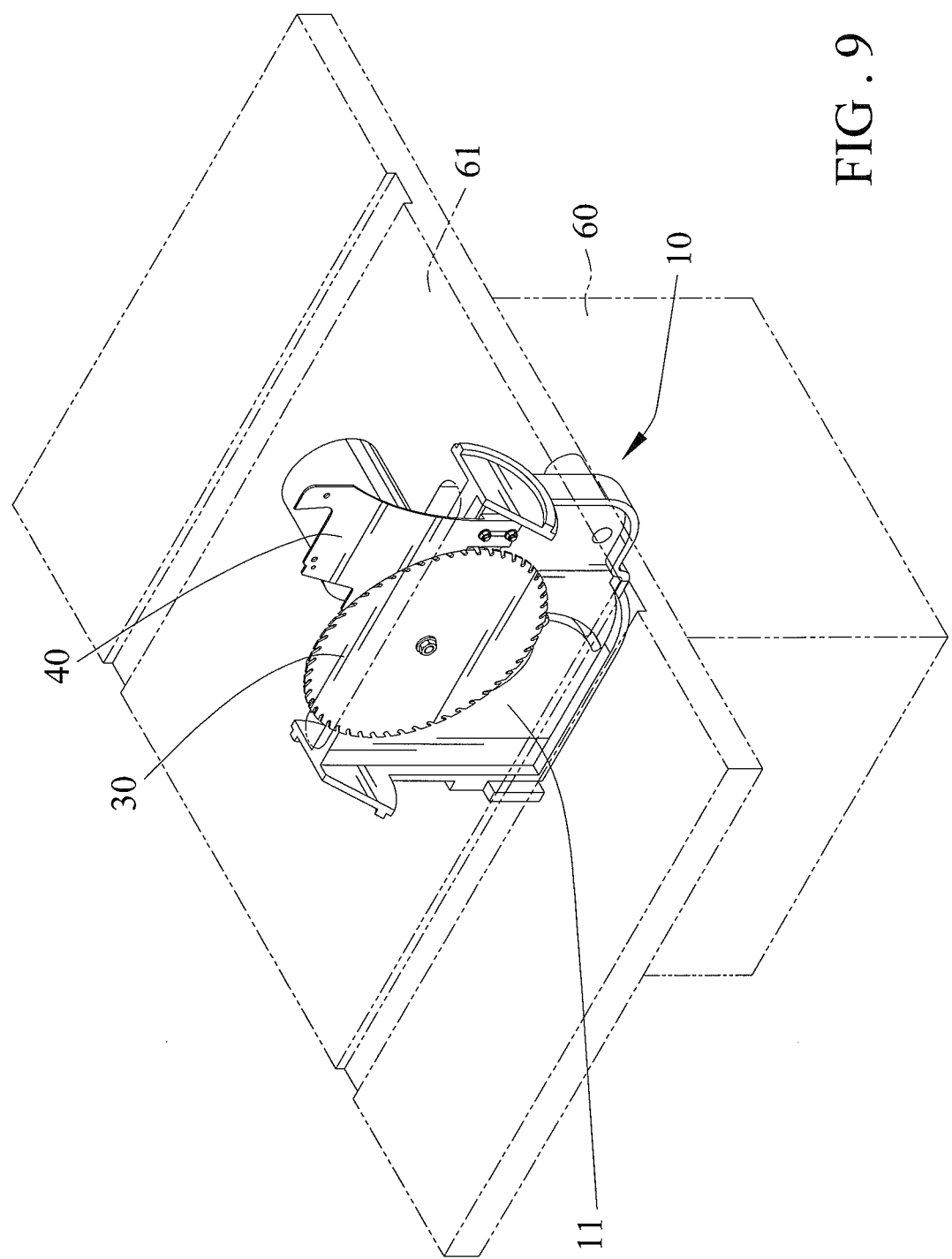
FIG. 9 is a perspective view of the apparatus shown in FIG. 1 installed to a saw grinding machine.

FIGS. 1 through 5 and 9 show an apparatus for fixing a saw blade 30 and a knife plate 40 of a saw grinding machine 60. The apparatus includes a driving device 10 and a fixture plate 20.

The driving device 10 includes a base member 11 coupled to the saw grinding machine 60 and having a lift/lower trough 111, a pivot 112 and an arcuate adjustment slot 113 or trough 113, an adjusting block 12 and a driving element 13. A pivotal portion 121 is provided at an end of the adjusting block 12 and pivotally connected to the pivot 112 of the base member 11 so that the adjusting block 12 is able to pivot with respect to the base member 11. An arcuate toothed portion 122 and a connective base 123 are provided at another end of the adjusting block 12 opposite to the pivotal portion 121. The toothed portion 122 is engaged with a bolt (not shown) to adjust the adjusting block 12 to pivot, and the connective base 123 corresponds to the lift/lower trough 111. The driving element 13 includes an axial portion 131 or drive shaft 131 inserted through and pivotally connected to the connective base 123.

The fixture plate 20 is pivotally connected to the connective base 123 and includes a connective hole 21, a coupled portion 22 and a guiding portion 23. In this case, the fixture plate 20 is preferably L-shaped. Hence, the coupled portion 22 and the guiding portion 23 are respectively provided at two ends of the fixture plate 20 and approximately perpendicular to each other, and the connective hole 21 is provided at a connection of the coupled portion 22 and the guiding portion 23.

The connective hole 21 is mounted on a side of the connective base 123 of the driving device 10. A mounted ring 211 is provided between the connective hole 21 and the connective base 123 to pivot the fixture plate 20 with respect to the connective base 123. A base disc 201 is provided to an exterior side of the connective hole 21 and engaged with the connective base 123 via numbers of fixture elements 202 for covering on the exterior side of the fixture plate 20 so that the fixture plate 20 is moved with the driving device 10 simultaneously.

A distance between the coupled portion 22 and the connective hole 21 is larger than a distance between the guiding portion 23 and the connective hole 21. Two projections 221 project from a side of the coupled portion 22 opposite to the driving device 10.

The guiding portion 23 is slideably disposed in the adjustment slot or trough 113 of the base member 11 so that the adjustment slot or trough 113 guides the connective hole 21 to be positioned in the same horizontal position as the coupled portion 22. A through-hole 231 is defined at the guiding portion 23 and corresponds to the adjustment slot or trough 113 of the base member 11. A limited element 232 is adapted to be inserted through the through-hole 231 and the adjustment slot or trough 113 and connects the fixture plate 20 to the base member 11 for guiding the fixture plate 20 in position.

The saw blade 30 includes an axial hole 31 installed to the axial portion 131 of the driving device 10 so that the driving device 10 drives the saw blade 30 to process a cutting operation. The axial hole 31 of the saw blade 30 and the connective hole 21 of the fixture plate 20 are co-axial, and the saw blade 30 and the fixture plate 20 are parallel to each other.

The knife plate 40 is fixed to the coupled portion 22 of the fixture plate 20 and includes a coupled portion 41 having a slot 411. The coupled portion 41 has a thickness to firmly engage the slot 41 with the two projections 221 of the coupled portion 22 of the fixture plate 20. The knife plate 40 is fixed to the fixture plate 20 via engagements of two engagement units 412 with the two projections 221. A blocked side 42 is formed on a side of the knife plate 40 and corresponds to the outer periphery of the saw blade 30. A vertical distance between one position on the blocked side 42 and the saw blade 30 would be maintained to be fixed by the knife plate 40 fixed to the coupled portion 22 of the fixture plate 20.

Referring to FIGS. 6 through 9, the adjusting block 12 can drive the fixture plate 20 and the saw blade 30 to move simultaneously to lift/lower the saw blade 30 with respect to the saw grinding machine 60. While the adjusting block 12 is pivoted in the lift/lower trough 111 of the base member 11, the guiding portion 23 guides the connective hole 21 and the coupled portion 22 of the fixture plate 20 to be maintained in the same horizontal position. The saw blade 30, the adjusting block 12 and the fixture plate 20 move simultaneously with one another, and the knife plate 40 is fixed to the coupled portion 22 of the fixture plate 20. The knife plate 40 moves simultaneously with the fixture plate 20. The vertical distance between the blocked side 42 and the saw blade 30 would be maintained to be fixed by fixing the knife plate 40 to the coupled portion 22 of the fixture plate 20.

The base member 11 is installed to the saw grinding machine 60, and the saw blade 30 is able to be lifted or lowered with respect to a platform 61 of the saw grinding machine 60. A vertical distance between the knife plate 40 and the saw blade 30 can be fixed. Therefore, the knife plate 40 can split wood accurately.

Figure 10B:
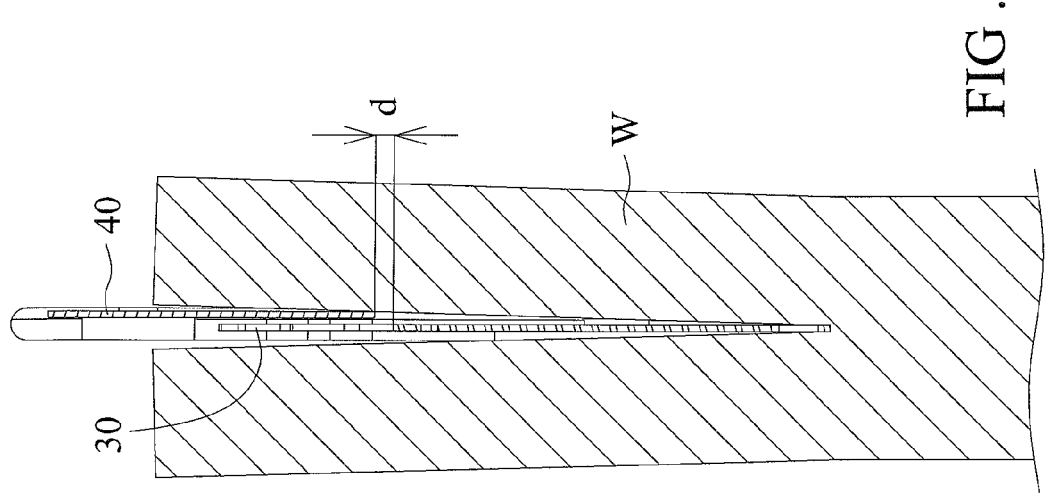
FIGS. 10a and 10b are cross-sectional views of the apparatus shown in FIG. 1, illustrating a wood plate being cut by the saw blade.
Figure 10A:
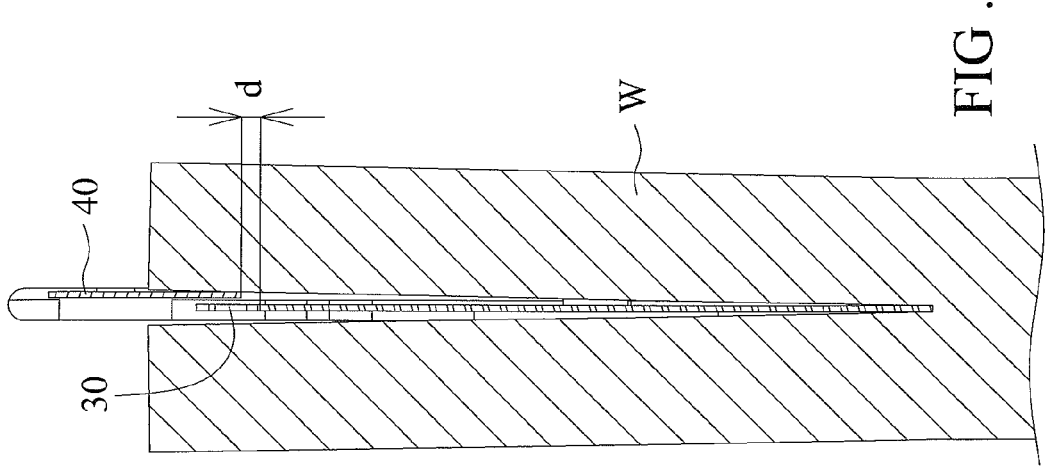

FIGS. 10*a* and 10*b* show a wood plate W cut by the saw blade 30. While the saw blade 30 moves to cut the wood plate W, the knife plate 40 is driven to move with respect to the saw blade 30. Thus, the cut wood plate W can be divided by the knife plate 40 easily. Further, because the knife plate 40 and the saw blade 30 are able to move simultaneously in use, a vertical distance d between the knife plate 40 and the saw blade 30 would be fixed, no matter which position the saw blade 30 moves to.

While several embodiments of the invention have been shown and described, it will be apparent to those skilled in the art that modifications may be made therein without departing from the scope and spirit of the present invention.

What is claimed is:

1. A saw comprising:
   a fixture plate including a coupled portion defined at a first end thereof and a guiding portion defined at a second end thereof, with the fixture plate further including a connective hole,
   wherein the connective hole is provided at a connection of the coupled portion and the guiding portion, and
   the coupled portion and the guiding portion are approximately perpendicular to each other such that the fixture plate is L-shaped;
   a driving device including a drive shaft and a base member, the base member having an adjustment slot, with the guiding portion of the fixture plate slideably mounted to the adjustment slot so as to maintain the coupled portion at the same relative vertical position with respect to the connective hole of the fixture plate during a vertical movement of the fixture plate relative to the base member,
   wherein the guiding portion of the fixture plate is formed with a through-hole and a limited element is inserted through the through-hole and into the adjustment slot to provide the slidable mounting of the guiding portion to the adjustment slot;
   a saw blade connected to the drive shaft of the driving device, with the drive shaft extending axially through the connective hole of the fixture plate, with the drive shaft extending axially through the saw blade and connected to rotate with the saw blade so that the saw blade and the fixture plate are movable with respect to the adjustment slot simultaneously, and with the fixture plate located intermediate the driving device and the saw blade; and
   a knife plate coupled to the coupled portion of the fixture plate and including a blocked side formed on a side thereof, with a vertical distance between the blocked side and the saw blade maintained so to be fixed.

2. The saw as claimed in claim 1 further comprising a plurality of projections projecting from a side of the coupled portion opposite to the driving device;
   wherein the knife plate includes a coupled portion having a slot coupled to the plurality of projections.

3. The saw as claimed in claim 2 further comprising a plurality of engagement units engaging the coupled portion of the knife plate to the plurality of projections, with the coupled portion of the knife plate having a thickness.

4. The saw as claimed in claim 1, wherein a distance between an end of the coupled portion and the connective hole is larger than a distance between an end of the guiding portion and the connective hole.

5. The saw as claimed in claim 1, wherein the drive shaft extends through the saw blade via an axial hole formed in the saw blade, with the axial hole and the connective hole of the fixture plate being co-axial, and with the saw blade and the fixture plate being parallel to each other.

6. The saw as claimed in claim 1, wherein the a base member is coupled to a platform, an adjusting block having a pivotal portion pivotally connected to the base member and a connective base opposite to the pivotal portion, and a driving element, with the drive shaft extending from the driving element and inserted through and pivotally connected to the connective base.

7. The saw as claimed in claim 6, wherein the base member includes a lift/lower trough and a pivot, with the connective base corresponding to the lift/lower trough, and with the pivot connected to the pivotal portion of the adjusting block.

8. The saw as claimed in claim 6, wherein the connective hole of the fixture plate is mounted on a side of the connective base of the driving device and the fixture plate includes a mounted ring provided between the connective hole and the connective base; and wherein the fixture plate includes a base disc provided to an exterior side of the connective hole and engaged with the connective base via a plurality of fixture elements.

\* \* \* \* \*